US008996189B2

(12) United States Patent
Lentner

(10) Patent No.: US 8,996,189 B2
(45) Date of Patent: Mar. 31, 2015

(54) METHOD AND DEVICE FOR OPTIMIZED ENERGY MANAGEMENT

(75) Inventor: Konrad Lentner, Mintraching (DE)

(73) Assignee: EADS Deutschland GmbH, Ottobrunn (DE)

( * ) Notice: Subject to any disclaimer, the term of this patent is extended or adjusted under 35 U.S.C. 154(b) by 383 days.

(21) Appl. No.: 13/059,859

(22) PCT Filed: Aug. 8, 2009

(86) PCT No.: PCT/DE2009/001138
§ 371 (c)(1),
(2), (4) Date: May 10, 2011

(87) PCT Pub. No.: WO2010/020219
PCT Pub. Date: Feb. 25, 2010

(65) Prior Publication Data
US 2011/0218688 A1 Sep. 8, 2011

(30) Foreign Application Priority Data

Aug. 22, 2008 (DE) .......................... 10 2008 039 334

(51) Int. Cl.
*G06F 1/28* (2006.01)
*G05D 23/19* (2006.01)
(Continued)

(52) U.S. Cl.
CPC .... *H02J 3/14* (2013.01); *H02J 1/14* (2013.01)
USPC ........................... 700/293; 361/93.8; 361/103

(58) Field of Classification Search
CPC .............. G05D 23/24; H02J 3/14; H02J 1/14; H02H 6/00; H02H 5/00; H02H 5/04
USPC .................................................. 361/93.8, 103
See application file for complete search history.

(56) References Cited

U.S. PATENT DOCUMENTS 4,100,428 A * 7/1978 Delisle et al. .................... 307/97
5,221,891 A * 6/1993 Janda et al. .................... 323/350
(Continued)

FOREIGN PATENT DOCUMENTS

DE       35 36 098 A1    4/1987
DE       198 13 471 A1   9/1999
(Continued)

OTHER PUBLICATIONS

EPO, "Machine Translation DE 3536098", Apr. 9, 1987, pp. 4.*
(Continued)

*Primary Examiner* — Kenneth Lo
*Assistant Examiner* — Olvin Lopez Alvarez
(74) *Attorney, Agent, or Firm* — Crowell & Moring LLP

(57) ABSTRACT

A method for optimized energy management of an electrical system is provided for protecting a component to be protected of the electrical system. The power dissipation of at least one component to be protected is determined, the expected temperature increase is calculated using a thermal model. An estimated end temperature is determined using the expected temperature increase and an ambient temperature. The estimated end temperature is compared with a predefined temperature threshold value. Consumer loads are switched on or off depending on their priority. A device for carrying out the method is provided. The device includes a power meter, calculation unit storage unit, and switching unit for switching consumer loads The electrical system to which the device is assigned includes at least one consumer load and at least one component to be protected.

15 Claims, 1 Drawing Sheet

(51) Int. Cl.
*H02J 3/14* (2006.01)
*H02J 1/14* (2006.01)

(56) References Cited

U.S. PATENT DOCUMENTS

| | | | | |
|---|---|---|---|---|
| 5,497,072 | A * | 3/1996 | LeComte et al. | 323/289 |
| 5,600,575 | A * | 2/1997 | Anticole | 702/132 |
| 6,052,268 | A | 4/2000 | Thomas | |
| 6,759,891 | B2 * | 7/2004 | Dotson | 327/512 |
| 6,888,469 | B2 * | 5/2005 | Seferian | 340/640 |
| 7,132,313 | B2 * | 11/2006 | O'Connor et al. | 438/122 |
| 7,304,826 | B2 * | 12/2007 | Yuan et al. | 361/19 |
| 7,574,321 | B2 * | 8/2009 | Kernahan et al. | 702/179 |
| 7,675,721 | B2 * | 3/2010 | Elms | 361/42 |
| 7,925,899 | B2 * | 4/2011 | Gumma et al. | 713/300 |
| 8,159,160 | B2 * | 4/2012 | Dishman et al. | 318/268 |
| 8,179,705 | B2 * | 5/2012 | Chapuis | 363/141 |
| 8,405,946 | B2 * | 3/2013 | Higuchi et al. | 361/103 |
| 2003/0216818 | A1 | 11/2003 | Damrath et al. | |
| 2006/0273753 | A1 * | 12/2006 | Cohen et al. | 318/806 |
| 2007/0014066 | A1 * | 1/2007 | Ye | 361/100 |
| 2007/0165349 | A1 * | 7/2007 | Parker | 361/103 |
| 2007/0253132 | A1 * | 11/2007 | Nakamura et al. | 361/103 |
| 2009/0306914 | A1 * | 12/2009 | Cohen | 702/60 |
| 2012/0022708 | A1 * | 1/2012 | Higuchi et al. | 700/293 |

FOREIGN PATENT DOCUMENTS

| | | | |
|---|---|---|---|
| DE | 198 42 429 A1 | 3/2000 | |
| DE | 100 58 404 A1 | 7/2002 | |
| DE | 102 57 425 A1 | 6/2004 | |
| DE | 103 41 904 A1 | 4/2005 | |
| EP | 1 657 796 A1 | 5/2006 | |
| EP | 1 744 429 A2 | 1/2007 | |
| EP | 1 744 429 A3 | 1/2007 | |
| JP | 2009130944 * | 6/2009 | H02H 5/04 |
| WO | WO 2007/009675 A1 | 1/2007 | |

OTHER PUBLICATIONS

EPO, "Machine Translation DE 19842429", Mar. 23, 2000, pp. 4.*
Wikipedia, "Electrical Efficiency", downloaded Apr. 5, 2013, pp. 3.*
International Search Report with partial English translation dated Feb. 9, 2010 (four (4) pages).
Form PCT/ISA/237 with English translation (eleven (11) pages).
German Office Action dated Mar. 12, 2014 (six (6) pages).

* cited by examiner

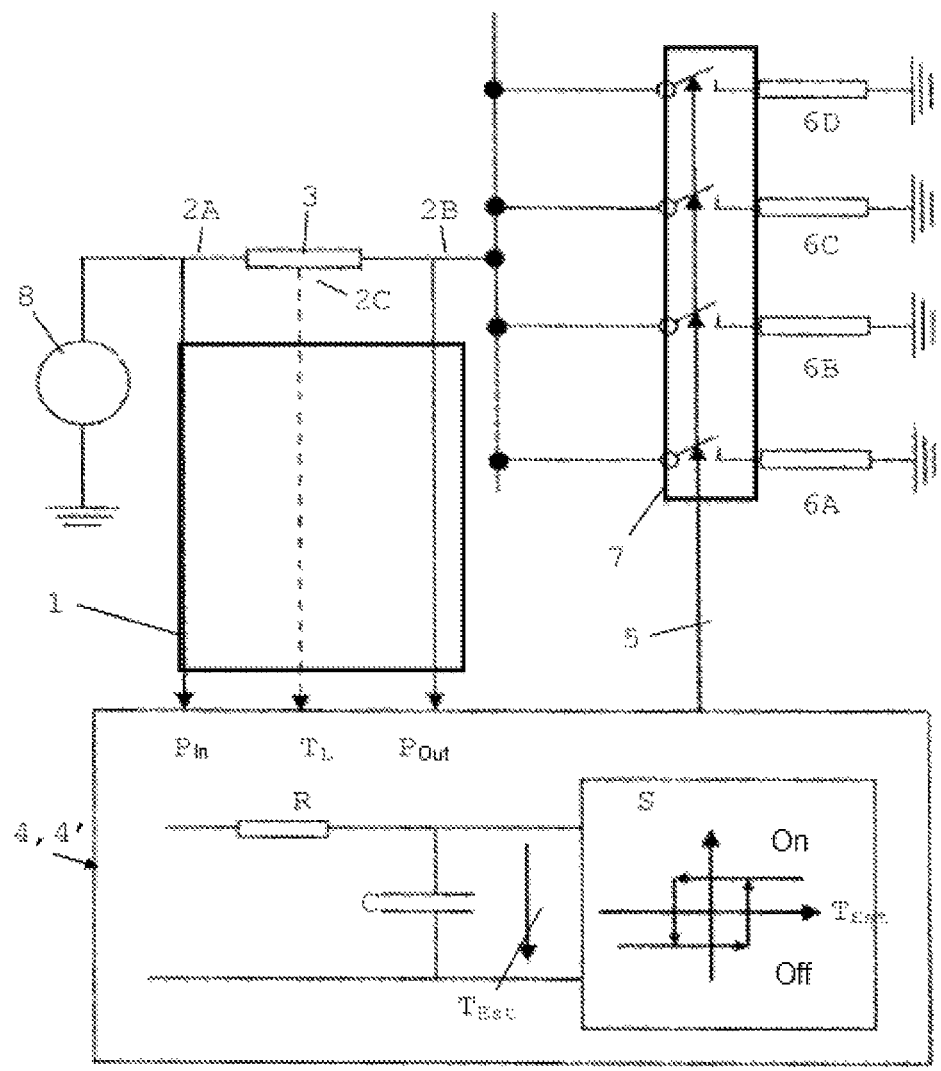

METHOD AND DEVICE FOR OPTIMIZED ENERGY MANAGEMENT

BACKGROUND AND SUMMARY OF THE INVENTION

Exemplary embodiments of the present invention relate to the field of energy management of electrical systems, and in particular to a method for optimized energy management of an electrical system, wherein the energy management serves for protecting a component to be protected of the electrical system.

As is known, during the operation of electrical machines and other consumer loads which by definition include also, for example, electrical power, an energy loss is generated. This so-called power dissipation $P_{Diss}$ is converted into heat and results in most cases in an undesired increase of the temperature T of the respective component.

Depending on the respective consumer load's efficiency which, if the input power $P_{in}$ and the output power $P_{out}$ is known, can be calculated with the known formula $$\eta = P_{Out}/P_{In} \qquad (\text{Eq. 1})$$

the portion of the input power $P_{in}$ converted into heat increases with decreasing efficiency $\eta$, and a lower output power remains.

Electrical systems consist mostly of a plurality of electrical consumer loads. For economic reasons, the energy source (generator) providing the electrical power is usually designed for an average supply power, wherein under certain circumstances short-time power peaks can be provided, whereas exceeding the average supply power over a long period of time can result in unacceptably high heating of the generator, and in the worst case in the destruction of the generator.

Moreover, this problem applies not only to the generator itself, but also the electrical lines running from the generator to the individual consumer loads, which can be unacceptably heated during a long-term overload because the lines are also dimensioned under the same considerations. However, since the heating is time-delayed, short power peaks can, in most cases, be transferred without problems.

In order to avoid unacceptable heating of the described components, measures have to be taken which, in the case of a power peak, limit the same with respect to its time frame. For this purpose, the respective consumer loads (e.g. electrical machines, heating systems) requiring the power are prioritized. In case of an occurrence of a power peak, first, the consumer load with the lowest priority is disconnected from the generator so that the required total power decreases. If the power is still too high, the consumer load with the next higher priority is disconnected, etc. As soon as the total power not only falls below the admissible maximum value but sufficient capacity for the consumer load disconnected last is available again, the load is switched on again, etc.

The task of switching off and on prioritized consumer loads is handled by automatic power or energy management systems. These systems map the logic chronological sequence, for example in the form of finite state automations. Such finite state automations, also referred to as finite state machines, are used, among other things, for the development of digital circuits and the modeling of their application behavior, e.g., in case of controls. Finite state automations are based on discrete states and can cause rule-based exit states if at their entry or entries, the adequate entry information is provided and the rules are stored, e.g. in the form of logical tables.

Motor vehicle energy management systems are known. German patent document number DE 103 41 904 B4 discloses a system that compares the energy available in a motor vehicle with the energy required by the individual consumer loads. The non-safety-relevant components are switched off first in a rule-based manner or are supplied with energy in a delayed or throttled manner. In the event that the energy is still insufficient, the energy management system switches to an emergency program.

Another example for an energy management system is disclosed in German patent document number DE 10058404 A1, which discloses integrating the system in a first consumer load to which a second consumer load can be connected. If the second consumer load is switched on and the power sum of both consumer loads exceeds an admissible value, the first consumer load is turned down or switched off until the second consumer load cancels its power requirements. This system includes a shunt resistor that is used as current sensor, as well as an electrical throttle circuit.

However, the use of finite state automations in connection with the energy management of electrical systems has a number of disadvantages. The preparation of control systems necessary for the operation, for example in the form of logic tables, is complicated. This is particularly true if a high number of consumer loads is present in the system or if a prediction of the behavior of consumer loads is difficult, for example because they can have a wide range of power consumptions. In addition, finite state automations offer only discrete switching states. When states lying between two discrete switching states are desired, the finite state automation has to simulate these states accordingly, which makes it even more complex.

A further essential disadvantage is that in case of frequently switching power consumers, such systems become frequently active themselves, thus prioritized consumer loads are switched off and on again in short time intervals. These frequent switching processes are caused by the discrete character of the finite state automations. If the energy management system becomes active too often, this, in turn, has a negative effect on the consumer loads which are connected and potentially on the ones which are switched off by the energy management system. In addition, switching off the consumer loads can take place too early and thus unnecessarily insofar as the trigger, namely exceeding the power requirement limit, has not yet caused problems with respect to a temperature exceeding a temperature limit. Also, with systems consisting of generator, consumer loads and energy management system can get into an undesired state that results in a self-influencing or even self-increasing change of the switching processes: When the energy management system is not getting active, the system would not have to continue to be active, but because it (possibly unnecessarily) became active, it has to become active again and again. Accordingly, limit cycles occur that in the short-term can result in an impairment in the fluent operation of the electrical system and long-term in a possible damage of the components of the system. Finally, the known systems detect the power; thus, they allow only an indirect conclusion with respect to the actual critical parameter, namely the temperature.

Exemplary embodiments of the present invention provide a method and a device that overcomes the disadvantages of the prior art. In particular, the design is simpler than the design of the finite state automations used in the prior art. Further, the invention can react to short-term exceedances of the upper power limit with a disconnection of the prioritized consumer loads only if an inadmissible temperature increase must be expected. Also, the method is self-stabilizing so that the occurrence of limit cycles is prevented. Finally, the temperature of the component to be protected is to be limited as accurately as possible.

According to the invention, a method for optimized energy management of an electrical system is provided. The electrical system can be any system that comprises electrical components such as energy sources, consumer loads etc. In particular, such an electrical system comprises at least one component to be protected, for the protection of which the method according to the invention is in particular intended. Often, the component to be protected is an electrical line which, in case of overloading, can be thermally damaged.

In a first step according to the invention, the power dissipation $P_{Diss}$ of at least one component to be protected of the electrical system is determined. This can take place in different ways which will be discussed in detail later on.

Subsequently, the determined (measured) power dissipation $P_{Diss}$ is entered into a thermal model of the respective component.

Finally, a calculation of the expected temperature increase $\Delta T$ of the respective component takes place using the thermal model. The model can also calculate the temperature change over time $\Delta T(t)$ so that not only the equilibrium temperature after a (theoretically infinitely) period of time but also the course of the same during the progressing heating can be calculated. For reasons of clarity, the time index "(t)" is omitted hereinafter; however, it is clear that all parameters that are mentioned within the context of the invention can possibly have a temporally variable course that is also to be detectable or calculable by the present invention.

When the ambient temperature is known or has been detected using an optional measurement unit, it is now possible to determine a temperature $T_{Est}$ to be expected of the respective component.

Subsequently, a comparison of the temperature $T_{Est}$ to be expected with a predefined temperature threshold value $T_{Max}$ is performed.

If, based on the calculation, it is found that the predefined temperature threshold value $T_{Max}$ of the component to be protected is exceeded, the disconnection of a consumer load from the mains (e.g. a generator) takes place depending on its priority. In this manner it is ensured that the amount of energy flowing through the component to be protected decreases and results in a reduction of the heating caused by the power dissipation $P_{Diss}$. When a plurality of consumer loads can be switched off, it is preferred that first the consumer load with the lowest priority is switched off again, then the consumer load with the next higher priority, etc.

In the opposite case, thus, when the temperature falls (again) below the predefined temperature threshold value $T_{Max}$ of the component to be protected, one of the consumer loads can be switched on depending on its priority. When a plurality of consumer loads has been switched off, it is preferred that first the switched-off consumer load with the highest priority is switched on again, after that, the consumer with the next lower priority, etc.

A particular advantage of the method is the forecast capability of the temperature development of the component to be protected. If the respective power is further queried, the future course of the temperature to be protected can be pre-calculated using the thermal model. In this manner it is also possible to reduce the power or to disconnect one or more consumer loads from the mains only if reaching the temperature threshold value $T_{Max}$ is imminent. This avoids an unnecessary switching off consumer loads that is based only on pure power determination of components to be protected and ignores the chronological course of the same and/or the actual or expected heating of the same. Also, the method provides a prediction of the point in time when the temperature falls below the temperature threshold value $T_{Max}$ so that those consumer loads can be selected in an intelligent manner, the selection of which results in a switch-off as short as possible.

According to the invention it is possible to perform the determination of the power dissipation $P_{Diss}$ of at least one component of the electrical system in one of the following ways.

According to the first embodiment, the determination takes place according to the pattern:

Measuring the input power $P_{In}$ and the output power $P_{Out}$ of the at least one component;

Calculating the power dissipation $P_{Diss}$ as the difference of the input power $P_{In}$ and the output power $P_{Out}$.

In other words: The at least one component to be protected is subjected to an electrical power. Within the component, a portion of the power is lost as power dissipation $P_{Diss}$ and causes heating. The input power and output power of the respective component is determined and the power dissipation derives from the difference.

According to an alternative embodiment, the determination takes place according to the pattern:

Predetermining the efficiency $\eta=P_{Out}/P_{In}$;

Measuring the input power or output power of the at least one component;

Calculating the respectively missing power value according to the formula $\eta=P_{Out}=\eta*P_{In}$ or $P_{In}=P_{Out}/\eta$;

Calculating the power dissipation $P_{Diss}$ as difference of input power $P_{In}$ and output power $P_{Out}$.

According to this, only one of the power values is determined through measurement. Using a predetermined efficiency $\eta$ which, in the case of a plurality of components to be protected is different in each case, the missing power component can be calculated. Subsequently, the calculation of the power dissipation takes place again according to the pattern above.

Alternatively, after completed measurement of one of the power values and with the known efficiency, the respective other power can also be calculated directly according to the formula $$P_{Diss}=P_{In}*(1-\eta) \tag{Eq. 2}$$

Of course, the determination of the power dissipation can also be carried out by other methods of the known prior art and future state of the art, which are not described here, without departing from the fundamental idea of the invention.

As already mentioned, the determination of the temperature increase $\Delta T$ to be expected is performed with the aid of a thermal model. The latter can be implemented in any manner; according to a preferred embodiment, this is based on an RC element. An RC element which is well known from the prior art represents a low-pass filter. In addition, when passing an RC element, the signal can be phase-shifted by an angle of up to 90 degrees. By modeling the thermal behavior of a component to be protected with an RC element, a model is obtained that shows a delayed response to slow and long lasting pulses (power increases) and hardly or not at all responds to fast and short-term pulses. As is known, bodies heated for example by electrical power show the same behavior.

According to a further preferred embodiment of the method according to the invention, the disconnection or connection of the consumer load or consumer loads takes place with consideration of a hysteresis loop. This means that the temperature threshold $T_{Max}$ for increasing power values is slightly shifted upwards (upper temperature threshold $T_{Max+}$)

so that the switch-off of consumer loads is slightly delayed, and that the temperature threshold $T_{Max}$ for power values decreasing again is slightly shifted downwards (lower temperature threshold $T_{Max}$) so that also the re-connection of consumer loads is slightly delayed. In this manner, the behavior of the energy management can be further "calmed down" because thereby, the number of switching processes (switching on and off consumer loads) decreases. If, for example, the state of the system would be very close to a critical value, even a minor change would cause a response of the energy management system which, immediately after the response, would be canceled again by the system in order to be triggered again, etc. Thus, this "limit-cycle-like" behavior can largely be prevented.

Different criteria can be used for determining the priority of the consumer load or consumer loads. According to a first preferred embodiment, the priority is based on its safety relevance. This means that less safety-relevant consumer loads (e.g. a car radio in a motor vehicle) have a lower priority than safety-relevant ones such as, e.g. the brake system or the headlight. According to a second embodiment, the priority of a consumer load is based on its power consumption. Low power consumer loads achieve a rather low effect through their switch-off so that they are given a high priority and accordingly are rarely switched, whereas high power consumer loads are given a low priority and, accordingly, are switched off rapidly if the energy management system has to provide protection for the components to be protected.

According to a preferred embodiment of the method, in addition to the aforementioned power values, the ambient temperature $T_L$ is also monitored. This temperature can then be included in the calculation using the thermal model because, as is known, the heating also depends on the ambient temperature or the temperature gradient between body and environment. Moreover, by adding the calculated temperature increase $\Delta T$ to the ambient temperature $T_L$, the temperature $T_{Est}$ to be expected can be calculated. The latter defines the absolute temperature of the component to be protected which, based the thermal model, is to be expected in each case at different times.

The invention also involves a device for optimized energy management of an electrical system. This device serves for carrying out the method according to the invention in a particularly advantageous manner. The device comprises the following components:
- at least one power meter for measuring an input power $P_{In}$ and/or an output power $P_{Out}$,
- a calculation unit for calculating the power dissipation $P_{Diss}$ and an expected temperature increase $\Delta T$ or an expected (estimated) end temperature $T_{Est}$ and for comparing the end temperature $T_{Est}$ to be expected or estimated using the calculation with a temperature threshold value $T_{Max}$,
- a storage unit for storing the priorities of consumer loads and optionally efficiencies of one or more components to be protected.
- a switching unit for switching consumer loads.

The power meter can be structured in any manner and can measure directly or indirectly. By definition, the power meter can measure power and if the unit has a plurality of inputs such as, e.g., measuring sensors or probes, it is also possible to record a plurality of power values. Preferably, the power meter has one or two measuring points. By an adequate changeover switch (multiplexer) and using a single-channel power meter it is also possible to cover a plurality of different measuring points by rapidly switching from one to the next and after the last one back to the first measuring point, and by storing or immediately process the corresponding measured values.

The calculation unit can be structured in any manner, such as a microcomputer or analog circuits. Besides a low price, the latter also have the advantage of a high processing speed but, on the other, are not easy to adapt to different tasks. The calculation unit calculates the power dissipation $P_{Diss}$ and preferably comprises the thermal model for calculating the temperature increase $\Delta T$. If the ambient temperature $T_L$ is known or predefined, it is also possible to calculate the end temperature $T_{Est}$. Finally, the calculation unit can preferably also carry out comparison operations so that by comparing the calculation result with the predefined temperature threshold value $T_{Max}$, the decision can be made whether a consumer load is to be switched off, and if so, which one is to be switched off.

For this, the device according to the invention comprises a storage unit for storing the priorities of consumer loads and optionally the efficiencies of one or more components to be protected and, if necessary, further parameters.

The switching unit, which is also comprised by the device, switches off consumer loads in order to provide protection in this manner for the components to be protected or, respectively, to switch the consumer load or consumer loads on again if the protection is no longer necessary. For this purpose, for example, electromechanical components such as relays as well as electronic components such as phase angle controls, thyristors and the like are used.

The device according to the invention is only assigned to the electrical system, wherein the latter interacts with the device according to the invention and comprises the component(s) to be protected. Alternatively, it is also possible that the device according to the invention comprises the electrical system. Also, further components such as at least one energy source and/or the at least one consumer load can be part of the electrical system or can be comprised by the device according to the invention. In other words: The device according to the invention can be provided as an individual unit or can serve for supplementing an already existing electrical system, or the electrical system includes the device according to the invention with all its essential components.

According to the invention, the at least one component to be protected can be a transfer element for electrical energy. Particularly preferred, said transfer element is an electrical line that heats up when power flows therethrough, wherein overheating is prevented in a controlled manner by the device according to the invention. Alternatively, the component to be protected can be a consumer load or also a generator such as, e.g., the one energy source of the electrical system. Of course, combinations of the different types of components to be protected are also possible. According to the invention, each individual component to be protected needs one or two measuring points by which the input power and/or the output power $P_{In}$ and $P_{Out}$, respectively, can be determined. If only one of the power values is measured, the efficiency $\eta$ is to be determined in advance for the calculation of the missing power value and to be provided for the calculation.

It is particularly preferred that the device according to the invention comprises a plurality of power meters and a calculation unit. A plurality of power meters means that a plurality of measuring points is provided for the plurality of components to be protected, wherein the actual measuring electronics has to be present only once and is switchably connected to the measuring points, for example by a multiplexer. Once the measuring data of, in each case, one component to be protected are available, the expected temperature increase $\Delta T$ or an expected end temperature $T_{Est}$ is determined by the one calculation unit and preferred by using the method according to the invention, and subsequently, the decision is made whether a consumer load is to be switched off or on, and if so, which one is to be switched off or on. According to the invention it is also preferred to determine first the power data of a plurality of components to be protected or of all of them and subsequently to make a decision that leads to the desired result with the fewest possible switch on and/or switch off processes.

The method and device of the present invention overcomes in the described manner the disadvantages of the prior art. In particular, the respective design that is adapted to the overall system is simpler than the design of the finite state automations used in the prior art. The device according to the invention responds to short-term exceedances of the upper power limit with switching off the prioritized consumer loads only if an inadmissible temperature increase is in fact to be expected. Also, the method according to the invention is self-stabilizing so that the occurrence of limit cycles is largely prevented. Finally, the method according to the invention offers the possibility of an accurate limitation of the temperature of the component to be protected.

BRIEF DESCRIPTION OF THE DRAWING FIGURES

The sole FIGURE shows schematically a preferred embodiment of the device according to the invention.

DETAILED DESCRIPTION

Referring to the sole FIGURE, the device comprises a power meter 1. In the illustrated embodiment, the power meter 1 is connected to two measuring points 2A and 2B. The latter, in turn, are in contact with a component 3 to be protected and record the time-dependent power values $P_{In}$ and $P_{Out}$ that are transferred using adequate lines and in the form of measuring data to a calculation unit 4 that also comprises a storage unit 4' that is not separately illustrated here.

In the illustrated embodiment there is also a measuring point 2C by which the (time-dependent) ambient temperature $T_L$ of the component 3 to be protected is transferred to the calculation unit 4.

The calculation unit 4 comprises the thermal model that is illustrated as an RC element consisting of a resistor R and a capacitor C. At the thermal model's output (illustrated on the right side of the RC element), the estimated (measured) end temperature $T_{Est}$ is available. It is clear that, depending on the specific configuration of the device, time-dependent variables such as, e.g., time-dependent power or temperature are also manageable with the illustrated embodiment.

The information of the end temperature (calculation result) is transferred into a further component of the calculation unit. Based on the estimated end temperature $T_{Est}$, the calculation unit decides if a switching state S="on" or S="off" is to be provided. When $T_{Est}$ rises above an upper temperature threshold $T_{Max+}$ (vertical, upward-pointing arrow), the switching state S switches to "on" (upper half of the diagram). When $T_{Est}$ falls below a lower temperature threshold $T_{Max-}$ (vertical, downward-pointing arrow), the switching state switches to "off" (lower half of the diagram). Depending on the horizontal distance between the two vertical arrows in the diagram and thus between $T_{Max+}$ and $T_{Max-}$, the change behavior of the switching state is more calm (larger distance) or more agile (smaller distance).

The calculation unit 4 can now switch the consumer loads 6A, 6B, . . . by a symbolically shown control line 5. For this purpose, an adequate switching unit 7 is present that is also symbolically illustrated. It is clear that the control line 5 is configured such that a selection of one or more consumer loads 6A, 6B, . . . is possible with the control line so that not all consumer loads are disconnected at the same time from an energy source 8 such as, e.g., a generator to which they are electrically connected.

REFERENCE LIST AND ABBREVIATIONS

1 Power meter
2A, 2B, 2C Measuring point
3 Component to be protected
4 Calculation unit
4' Storage unit
5 Control line
6, 6A, 6B, . . . Consumer load
7 Switching unit
8 Energy source
η Efficiency
$P_{In}$ Input power
$P_{Out}$ Output power
$P_{Diss}$ Power dissipation
R Resistor
C Capacitor
$T_L$ Ambient temperature
$T_{Max}$ Temperature threshold value
$T_{Max+}$ Upper temperature threshold
$T_{Max-}$ Lower temperature threshold
S Switching state

The invention claimed is:
1. A method for optimized energy management of an electrical system, comprising:
 pre-calculating a future course of a temperature of at least one component to be protected using a thermal model to determine an estimated end temperature $T_{Est}$ to be expected by
  determining power dissipation $P_{Diss}$ of the at least one component to be protected of the electrical system;
  inputting the power dissipation $P_{Diss}$ into the thermal model of the at least one component to be protected;
  calculating a future temperature increase ΔT to be expected of the at least one component to be protected using the power dissipation $P_{Diss}$ and the thermal model;
  calculating the estimated end temperature $T_{Est}$ to be expected based on the future temperature increase to be expected ΔT and an ambient temperature $T_L$;
  comparing the estimated end temperature $T_{Est}$ to be expected with a predefined temperature threshold value $T_{Max}$;
 disconnecting a consumer load from a mains depending on the consumer load's priority when the estimated end temperature $T_{Est}$ to be expected of the at least one component to be protected would result in a temperature of the at least one component to be protected to exceed a predefined temperature threshold value $T_{Max}$; and
 connecting a consumer load to the mains depending on the consumer load's priority when, based on the estimated end temperature $T_{Est}$ to be expected of the at least one component to be protected, the temperature of the at least one component to be protected would fall below the predefined temperature threshold value $T_{Max}$.

2. The method according to claim 1, wherein the determination of the power dissipation $P_{Diss}$ of the at least one component to be protected comprises:
  measuring an input power $P_{In}$ and output power $P_{Out}$ of the at least one component to be protected;
  calculating the power dissipation $P_{Diss}$ as a difference of the input power $P_{In}$ and output power $P_{Out}$.

3. The method according to claim 1, wherein the determination of the power dissipation $P_{Diss}$ of at least one component comprises:
  pre-determining an efficiency $\eta = P_{Out}/P_{In}$;
  measuring input power or output power of the at least one component to be protected;
  calculating the respectively missing power value according to the formula $P_{Out}=\eta*P_{In}$ or $P_{In}=P_{Out}/\eta$;
  calculating the power dissipation $P_{Diss}$ as a difference of input power $P_{In}$ and output power $P_{Out}$.

4. The method according to claim 1, wherein the thermal model is based on an RC element.

5. The method according to claim 1, wherein disconnecting or connecting the consumer load is performed with consideration of a hysteresis loop in which the predefined temperature threshold value $T_{Max}$ is higher disconnecting the consumer load than when connecting the consumer load.

6. The method according to claim 1, wherein the priority of the consumer load is based on the safety relevance of the consumer load.

7. The method according to claim 1, wherein the priority of the consumer load is based on power consumption of the consumer load.

8. The method according to claim 1, further comprising:
  measuring the ambient temperature $T_L$.

9. A device for optimized energy management of an electrical system, comprising:
  at least one power meter that measures an input power $P_{in}$ or an output power $P_{Out}$;
  a calculation unit that pre-calculates a future course of a temperature of at least one component to be protected using a thermal model to determine an estimated end temperature $T_{Est}$ to be expected by
    calculating a power dissipation $P_{Diss}$ of the at least one component to be protected,
    calculating a future temperature increase $\Delta T$ to be expected by inputting the power dissipation $P_{Diss}$ into the thermal model,
    calculating the estimated end temperature $T_{Est}$ to be expected based on the future temperature increase to be expected $\Delta T$ and an ambient temperature $T_L$, and
    comparing the end temperature $T_{Est}$ to be expected with a temperature threshold value $T_{Max}$,
  a storage unit storing priorities of consumer loads and efficiencies of one or more components to be protected,
  a switching unit that switches the consumer loads,
  wherein the electrical system comprises the following components
    at least one energy source,
    at least one consumer load,
    at least one component to be protected,
  wherein the switching unit is configured to disconnect the at least one consumer load when the end temperature $T_{Est}$ to be expected would result in a temperature of the at least one component to be protected to exceed the temperature threshold value $T_{Max}$ and connect the at least one consumer load when the end temperature $T_{Est}$ to be expected would result in a temperature of the at least one component to be protected to fall below the temperature threshold value $T_{Max}$.

10. The device according to claim 9, wherein the at least one component to be protected is a transfer element for electrical energy.

11. The device according to claim 9, wherein the at least one component to be protected is a consumer load.

12. The device according to claim 9, wherein the at least one component to be protected is an energy source.

13. The device according to claim 9, wherein the device comprises a plurality of power meters.

14. The device according to claim 9, wherein the device further comprises a temperature measuring unit that measures the ambient temperature $T_L$.

15. The device of claim 9, wherein the device is used in an aircraft or spacecraft.

* * * * *